United States Patent [19]

Atoji et al.

[11] 4,211,898

[45] Jul. 8, 1980

[54] HEADPHONE WITH TWO RESONANT PEAKS FOR SIMULATING LOUDSPEAKER REPRODUCTION

[75] Inventors: Nobuhisa Atoji; Takashi Matsumoto; Shoichi Kusumoto; Kazue Sato; Mitsuhiro Hasegawa, all of Kadoma, Japan

[73] Assignee: Matsushita Electric Industrial Co., Ltd., Osaka, Japan

[21] Appl. No.: 923,206

[22] Filed: Jul. 10, 1978

[30] Foreign Application Priority Data

Jul. 11, 1977 [JP] Japan .................................. 52/83325
Jul. 11, 1977 [JP] Japan .................................. 52/83326
Jul. 11, 1977 [JP] Japan .................................. 52/83327

[51] Int. Cl.[2] .......................... H04M 1/05; H04R 1/28
[52] U.S. Cl. ................................................ 179/156 R
[58] Field of Search .................................... 179/156 R

[56] References Cited

U.S. PATENT DOCUMENTS 4,058,688 11/1977 Nishimura et al. ............. 179/156 R

*Primary Examiner*—James W. Moffitt
*Attorney, Agent, or Firm*—Lowe, King, Price & Becker

[57] ABSTRACT

A headphone is designed to have two resonant peaks for simulating loudspeaker reproduction. The headphone comprises a housing in which an electroacoustic transducer with a diaphragm is positioned, wherein the housing is formed with a rearward cavity positioned adjacent to the diaphragm remote from the listener's ear to provide an acoustic compliance to the generated acoustic energy. In order to generate the two resonant peaks to simulate a sensation of realism as if the listener is hearing sound from a loudspeaker, the rearward cavity is communicated with the atmosphere through apertures. The acoustic compliance of the rearward cavity coacts with the apertures to produce two resonant peaks at frequencies corresponding to the frequencies of the peaks which occur in a signal from the loudspeaker.

4 Claims, 22 Drawing Figures

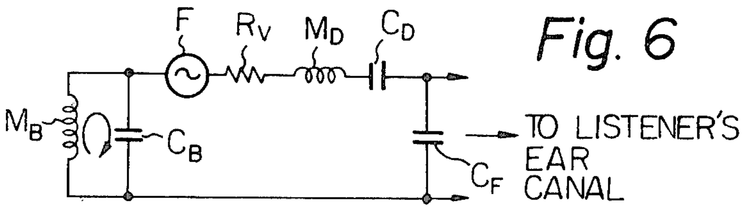
Fig. 6
Fig. 7
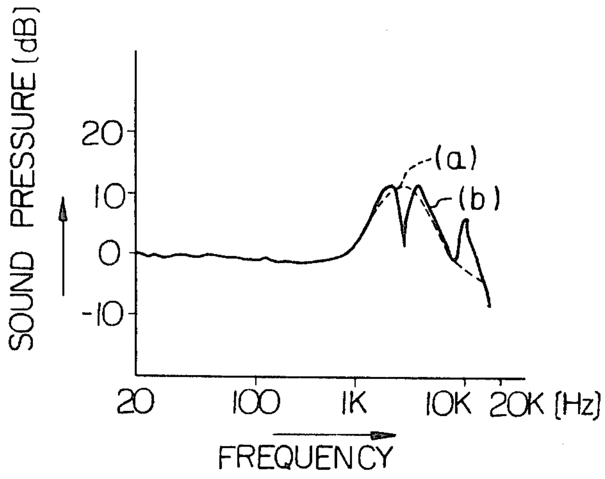
Fig. 8
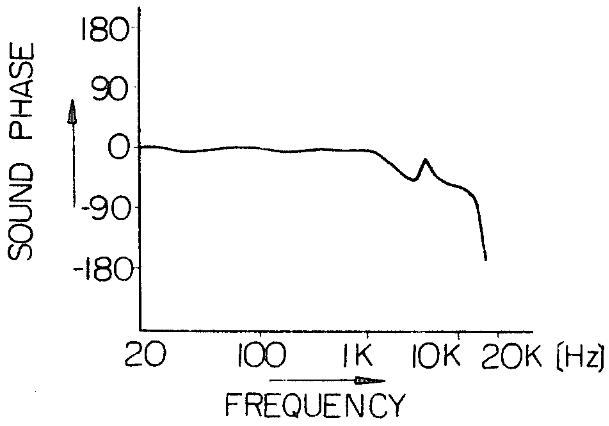

HEADPHONE WITH TWO RESONANT PEAKS FOR SIMULATING LOUDSPEAKER REPRODUCTION

BACKGROUND OF THE INVENTION

This invention relates generally to headphones and more particularly to a headphone for reproduction of sound with a frequency response which is analogous to that provided by loudspeakers, and still more particularly to a headphone with a sound pressure vs. frequency response having two resonant peaks to a listener's eardrum.

The following is a discussion of the significance of the sound pressure vs. frequency characteristic of a headphone to such realism as occurs in a loudspeaker system.

FIG. 1 depicts a diagram of a loudspeaker sound pressure measuring system using a dummy head 1. The dummy head 1, which duplicates a human head in dimentions, is positioned at an angle of 30 degrees to a loudspeaker 3 at a distance of 2 meters therefrom. Although the speaker itself has an essentially flat frequency response and a linear phase response, the response at the dummy head 1 exhibits two resonant peaks in the frequency response curve as shown in FIG. 2. Our investigation has revealed that the first peak is caused by resonances in the ear canal, while the second peak is due to diffractions from the head and external ear.

FIG. 3 depicts a diagram illustrating a dummy head 1 equipped with a headphone 4. If the sound pressure vs. frequency characteristic as shown iN FIG. 2 is reproduced at the diaphragm of the microphone 2, such a headphone imparts the sensation of realism to a listener as if he is hearing sound from the loudspeaker.

FIG. 4A depicts a vertical cross sectional view of a conventional headphone, and FIG. 4B depicts an enlarged sectional view of a portion of the headset of FIG. 4A. A diaphragm 9, mounted within a housing 5, defines a rear cavity 12 with the rear wall of the housing 5. The housing 5 is formed with an aperture 13 in which a mesh 13' is fitted. The diaphragm 9 is supported by suitable spacers 8 and carries a printed voice coil (no numeral) made of, for example, aluminum. An earpad 7 is secured to one side of front panel 6 with an opening (no numeral). The front panel 6 is in turn fixedly attached at its other side to the housing. A pair of yokes 11 are retained within the housing 5 in a manner to hold the spacers 8 therebetween. Each of the yokes 11 carries a plurality of plate-like magnets 10 thereon. The arrangement of the magnets 10 is such that the polarities of the facing magnets are identical with each other.

With this arrangement, when a current is supplied to the voice coil, fluxes of the magnets 10 cause the diaphragm 9 to vibrate in accordance with Fleming's left hand law. However, in sound pressure vs. frequency response of the conventional headphone of FIG. 4A of the conventional headphone measured with the system of FIG. 3, only one resonant peak occurs as indicated by broken line curve (a) of FIG. 7. This means that the sensation of realism identical to that of the loudspeaker system is not achieved with this prior headphone.

SUMMARY OF THE INVENTION

It is a principal object of this invention to provide a headphone which exhibits realism as if the listener hears sound from the loudspeaker.

It is a further object of this invention to provide a headphone having two resonant peaks at the listener's eardrum.

It is a further and more specific object of this invention to provide a markedly improved headphone, comprising: an electroacoustic transducer including a vibration means for supplying an acoustic signal in response to a supplied electrical signal; a hollow housing adapted for retaining the electroacoustic transducer, defining a cavity having acoustic compliance together with the vibration means such that the cavity is positioned opposite a user's external ear side relative to the vibration means, and being formed with one or more through bores having mass reactance, the cavity communicating with the atmosphere through the bore, whereby a sound pressure vs. frequency response having two peaks is effected at the user's eardrum by parallel resonance between the acoustic compliance of the cavity and the mass reactance of the bore.

BRIEF DESCRIPTION OF THE DRAWINGS

Additional objects as well as features and advantages of this invention will become evident from the detailed description set forth hereinafter when considered in conjunction with the accompanying drawings, wherein like parts in each of the several figures are identified by the same reference numerals and characters and wherein:

FIG. 6 depicts an electrical network which is an electrical analogue of the electroacoustic system depicted in FIG. 5;

FIG. 7 depicts a sound pressure vs. frequency response, effected at a listener's eardrum, of the first preferred embodiment of FIG. 5, and also depicts another sound pressure vs. frequency response of the prior art;

FIG. 8 depicts a sound phase vs. frequency system of the first preferred embodiment of this invention;

DETAILED DESCRIPTION

Figure 4A:
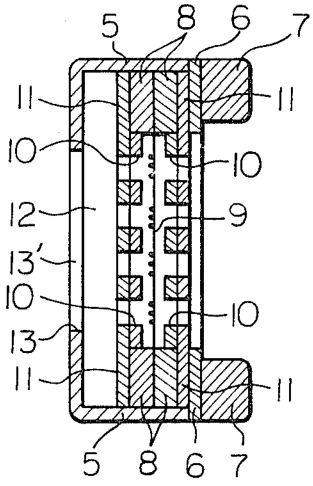
Fig. 4A PRIOR ART
FIG. 4A depicts a vertical cross section of a conventional headphone.
Figure 4B:
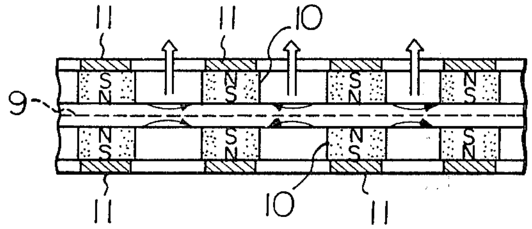
Fig. 4B PRIOR ART
FIG. 4B depicts an enlarged section of a portion of the headphone of FIG. 4A.
Figure 5:
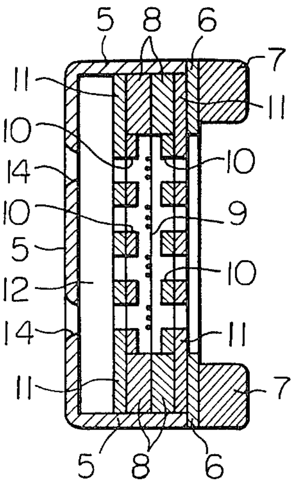
FIG. 5 depicts a vertical section of a headphone in accordance with a first preferred embodiment of this invention.

Referring to FIG. 5, a vertical section of first preferred embodiment of this invention is illustrated which is structurally different from the conventional headphone of FIG. 4 to the extent that the the mesh plate 13' of FIG. 4 is removed and two through bores 14, each having mass reactance, are provided in FIG. 5 therefor. The through bores 14 function as acoustic tubes having mass reactance.

FIG. 6 depicts an electrical network which is an electrical analogue of the electroacoustic system shown in FIG. 5. An electromotive force F is series connected with a resistor $R_V$, an inductance $M_D$, and capacitors $C_B$, $C_D$ and $C_F$. The capacitor $C_B$ is connected in parallel with another inductor $M_B$. These electrical analogues of FIG. 6 correspond respectively to acoustic functions of the electroacoustic transducer of FIG. 5 as follows:

F: mechanomotive force;

$R_V$: electromagnetic damping due to the voice coil;

$M_D$: mass in vibration system;

$C_D$: compliance of vibration system;

$C_B$: acoustic compliance of the rear cavity 12;

$C_F$: acoustic compliance of spatial volume defined by the diaphragm 9 and a listener's external ear;

$M_B$: mass reactance of the through bore 14.

FIG. 7 illustrates a sound pressure vs. frequency response, effected at a listener's eardrum, of the first preferred embodiment of FIG. 5 by solid curve (b), and also depicts another sound pressure vs. frequency response of the prior art of FIG. 4A by broken line (a). As is seen from FIG. 7, the response in accordance with the first preferred embodiment has twin peaks in a range from 1 kHz to 10 kHz due to parallel resonance between the acoustic compliance $C_B$ and the mass reactance $M_B$. Inasmuch as this response curve is analogous to that of FIG. 2, it is understood that the headphone embodying this invention can impart the sensation of realism as occurs when one listens to the loudspeaker system of FIG. 1.

Figure 1:
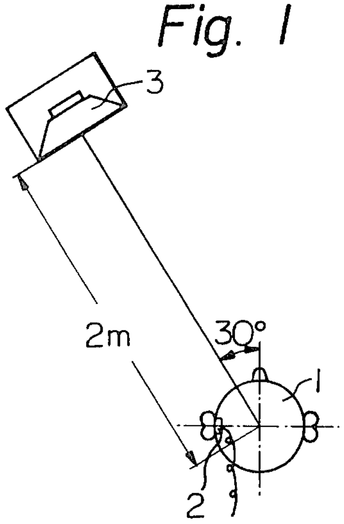
FIG. 1 depicts an arrangement for measuring loudspeaker's sound pressure and phase characteristics at a listener's eardrum by using a dummy head.
Figure 9:
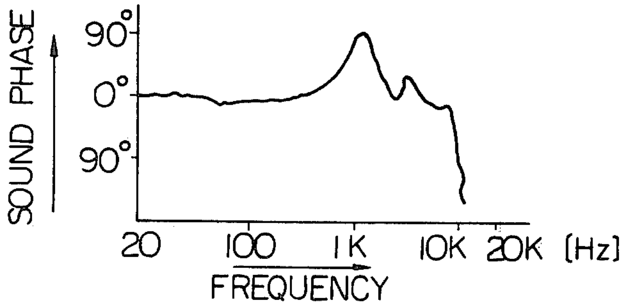
FIG. 9 depicts a sound phase vs. frequency response of the loudspeaker system depicted in FIG. 1.

A second preferred embodiment of this invention capable of achieving even greater realism than the first will now be discused. A sound phase vs. frequency response of the first preferred embodiment, which effected at the diaphragm of the microphone 2 of FIG. 3 or at a listener's eardrum, is shown in FIG. 8, while a sound phase vs. frequency response associated with the loudspeaker system of FIG. 1, is shown in FIG. 9. It is understood that the responses of FIGS. 8 and 9 are not analogous to each other since the sound source of the headphone of FIG. 5 corresponds to the acoustic compliance $C_F$ of FIG. 6, and there is therefore a time lag caused by sound travelling distance from the diaphragm 9 of the headphone of FIG. 5 to the diaphragm of the microphone 2 of FIG. 3. Although the first preferred embodiment imparts the sensation of greater realism as compared with the prior art, it does not achieve the degree of realism of a loudspeaker system.

The second preferred embodiment however, achieves even greater realism than the first by making its sound phase vs. frequency response analogous to the response of FIG. 9.

Figure 10:
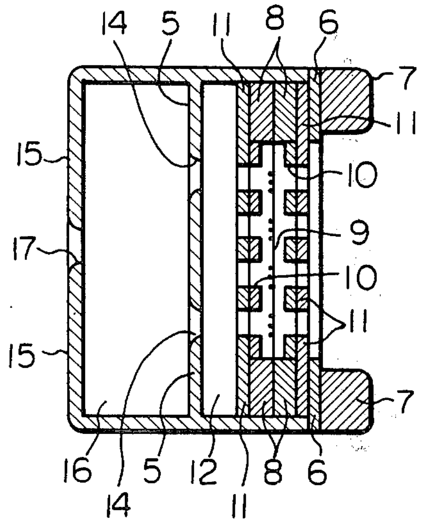
FIG. 10 depicts a vertical section of a headphone in accordance with a second preferred embodiment of this invention.

The second preferred embodiment of FIG. 10 comprises, in addition to the structural elements of the first, another cavity 16 defined by a newly-added shell 5 as well as the rear portion of the housing 5. The shell 15 is formed with a bore or opening 17 through which the cavity 16 communicates with the atmosphere. The cavity 16 also communicates with the cavity 12 through the bores 14.

Figure 11:
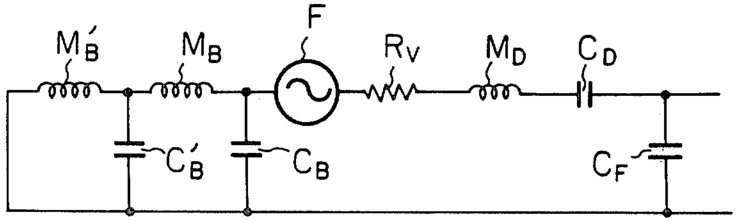
FIG. 11 depicts an electrical network which is an electrical analogue of the electroacoustic system depicted in FIG. 10.
Figure 12:
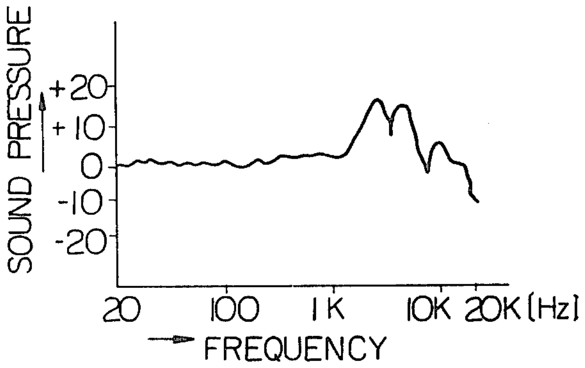
FIG. 12 depicts a sound pressure vs. frequency response of the second preferred embodiment of FIG. 10.
Figure 13:
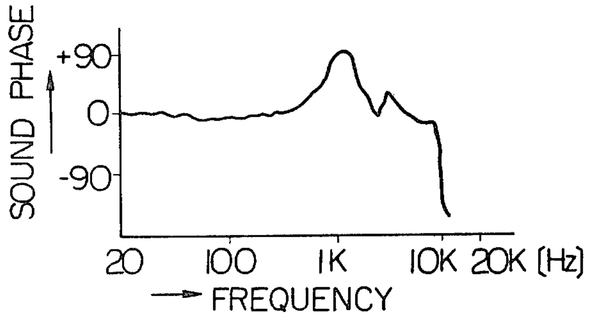
FIG. 13 depicts a sound phase vs. frequency response of the second preferred embodiment of FIG. 10.

FIG. 11 depicts an electrical network which is an electrical analogue of the electroacoustic system depicted in FIG. 10. As is seen from FIGS. 11 and 6, inductance $M_B'$ and capacitor $C_B'$ are added to the network of FIG. 6 in a manner that these new elements are series connected and the capacitor $C_B'$ is connected in parallel with the series connected circuit consisting of the inductor $M_B$ and the capacitor $C_B$. With the arrangement of FIG. 11, as is previously discussed in conjunction with FIG. 6, the parallel resonance (hereinafter referred to as first parallel resonance) between the acoustic compliance $C_B$ and the mass reactance $M_B$ of the bores 14 generates the twin peaks shown by the solid line of FIG. 7. Additionally, the lower frequency peak of FIG. 7 is made abrupt by making the frequency of second parallel resonance between the acoustic compliance $C_B'$ and the mass reactance $M_B'$ below the frequency of the first parallel resonance, thereby making the sound phase vs. frequency response analogous to that of FIG. 9. Accordingly, the second preferred embodiment can achieve greater realism as if listening to a loudspeaker system by advancing the sound phase at the first parallel resonance by making use of the second parallel resonance.

In the above, the frequency of the second parallel resonance is set, for example, in the vicinity of 1 kHz.

Figure 2:
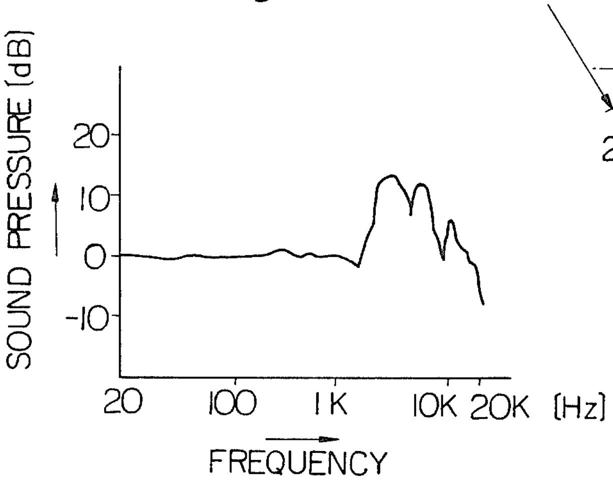
FIG. 2 depicts a loudspeaker's sound pressure vs. frequency response at a listener's eardrum where measured with the system of FIG. 1.

There will be hereinafter discussed a third preferred embodiment of this invention, which resembles the first in structure but makes its sound pressure and sound phase response at the diaphragm of the microphone 2 of FIG. 3 analogous to those of FIGS. 2 and 9, respectively. This is done by incorporating a phase advance circuit into the first preferred embodiment.

Figure 14:
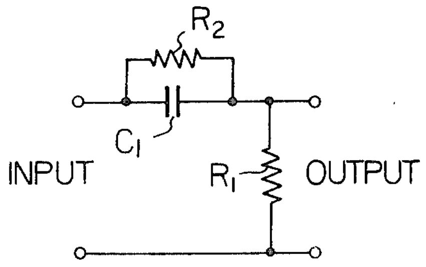
FIG. 14 depicts an electrical network incorporated into a third preferred embodiment of this invention.

FIG. 14 depicts a phase advance circuit of the third preferred embodiment, wherein a resistor R2 is connected in parallel with a capacitor C1 which forms a high-pass filter together with a resistor R1 which is series connected with the capacitor C1. The ratio of output to input potential is represented by the following equation:

$$\frac{1 + j\omega C_1 R_2}{1 + \frac{R_2}{R_1} + j\omega C_1 R_2}$$

Figure 15A:
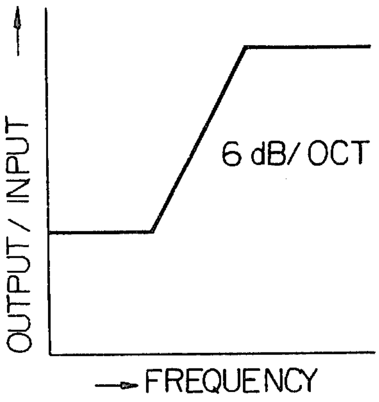
FIG. 15A depicts an output/input potential vs. frequency response of the electrical network of FIG. 14.
Figure 15B:
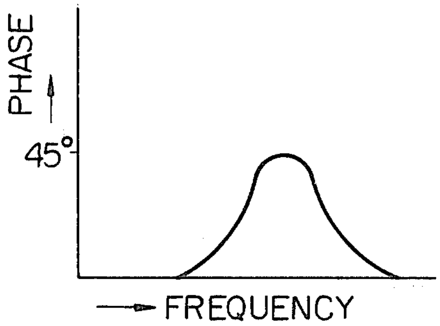
FIG. 15B depicts an electrical signal phase vs. frequency response of the electrical network of FIG. 14.

FIGS. 15A and 15B depict amplitude and phase characteristics of the circuit of FIG. 14, respectively.

Figure 3:
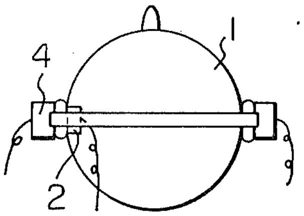
FIG. 3 depicts an arrangement for measuring headphone's sound pressure and phase characteristics at a listener's eardrum by using a dummy head.
Figure 18:
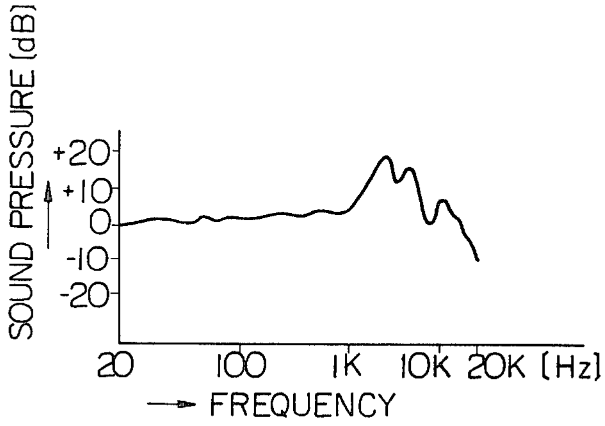
FIG. 18 depicts a sound pressure vs. frequency response of the third preferred embodiment.
Figure 19:
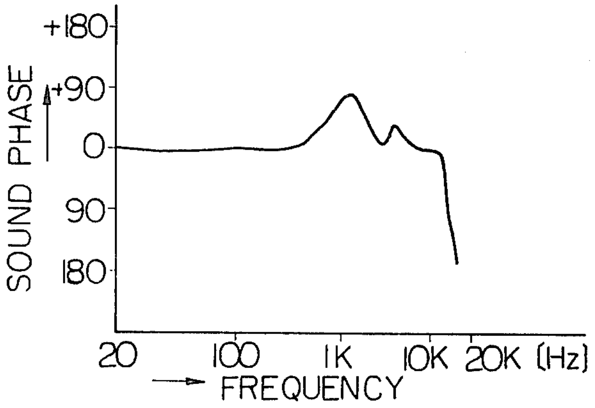
FIG. 19 depicts a sound phase vs. frequency response of the third preferred embodiment.

FIGS. 18 and 19 depict sound-pressure and sound phase responses of the third preferred embodiment of this invention, respectively, which are effected at the diaphragm of the microphone 2 of FIG. 3. It is therefore understood that, since the responses of FIGS. 18 and 19 are respectively analogous to those of FIGS. 2 and 9, this embodiment can achieve the realism of a loudspeaker system.

FIG. 17 shows an alternative phase advance circuit of the third preferred embodiment, in which a resistor R3 is connected in parallel with a capacitor C2 which forms a high-pass filter together with an inductor L1 and a resistor R4. The ratio of output to input potential is represented by the following equation:

$$\frac{(j\omega)^2 + \frac{j\omega}{C_2R_3}}{(j\omega)^2 + \frac{R_3 + R_4}{C_3R_3R_4}(j\omega) + \frac{1}{C_2L_1}}$$

Figure 16:
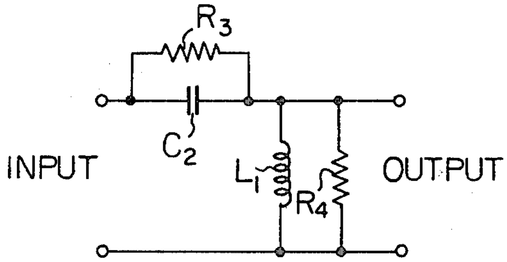
FIG. 16 depicts another electrical network incorporated into the third preferred embodiment of this invention.
Figure 17A:
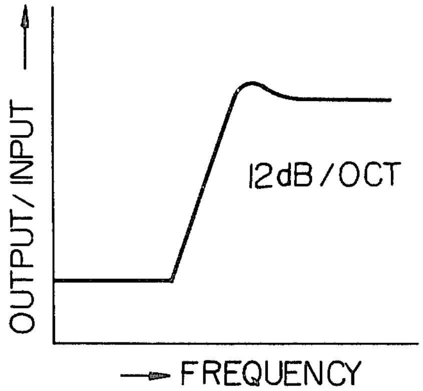
FIG. 17A depicts an output/input potential vs. frequency response of the electrical network of FIG. 16.
Figure 17B:
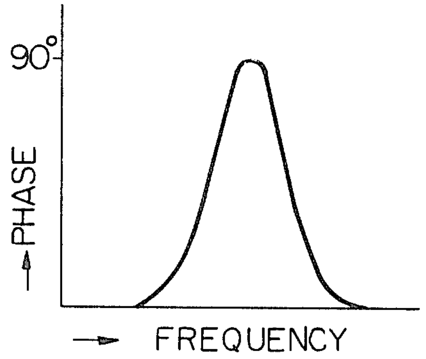
FIg. 17B depicts an electrical signal phase vs. frequency response of the electrical network of FIG. 16.

FIGS. 17A and 17B depict amplitude and phase characteristics of the circuit of FIG. 16, respectively.

Sound pressure and sound phase responses of the third preferred embodiment incorporating the circuit of FIG. 16 are also effected at the diaphragm of the microphone 2 of FIG. 3, so that this modification can achieve such a realism as listening to a loudspeaker system.

In practice, the phase of an electrical signal supplied to each of the circuits of FIGS. 14 and 16 is advanced in the vicinity of 1 kHz.

It is clear from the above descriptions of the preferred embodiments of this invention that the realism of listening to a loudspeaker system can be achieved.

It is believed obvious that other modifications and variations of this invention will be suggested to those skilled in the art in the light of the above teachings. It is therefore to be understood that changes may be made in the particular embodiments of this invention described which are within the full intended scope of this invention as defined by the appended claims.

What is claimed is:

1. A headphone comprising:

a headphone case having a plurality of perforations provided through the front surface thereof;

a diaphragm rearwardly spaced from said perforations;

means for causing said diaphragm to vibrate in response to an electrical signal to generate acoustic waves in opposite directions;

said headphone case having a cavity rearwardly of said diaphragm to provide an acoustic compliance to the acoustic waves propagating in the rearward direction, and an aperture through the rear surface thereof for providing an acoustic mass reactance to coact with the acoustic compliance of said cavity to produce two resonant peaks in a frequency range from 1 kHz to 10 kHz; and means for producing a phase advance in the vicinity of 1 kHz of said acoustic waves.

2. A headphone as claimed in claim 1, wherein said phase advance producing means comprises a high-pass filter having a resonant frequency in the neighborhood of 1 kHz connected to said diaphragm vibrating means.

3. A headphone as claimed in claim 1, wherein said diaphragm vibrating means comprises a first plurality of spaced permanent magnets of alternate polarities arranged in parallel on a first plane and a second plurality of spaced permanent magnets of alternate polarities arranged in parallel on a second plane spaced from said first plane, the permanent magnets of the like polarities on said first and second planes being in face to face relation, said diaphragm having a coil and located between said first and second pluralities of permanent magnets.

4. A headphone as claimed in claim 1, wherein said housing is formed with a second cavity adjacent to the first-mentioned cavity remote from said diaphragm, said second cavity being in communication with the first cavity through the first-mentioned aperture and with the atmosphere through a second aperture having such a dimension sufficient to produce an acoustic mass reactance, said second cavity having an acoustic compliance which coacts with the acoustic mass reactance of the second aperture to produce a second acoustic parallel resonance which imparts a phase advance to the acoustic waves generated in said first cavity.

* * * * *